United States Patent
Lemoine et al.

(10) Patent No.: US 11,187,159 B2
(45) Date of Patent: Nov. 30, 2021

(54) PIVOT FOR SLIDING BEARING AND GEAR TRAIN

(71) Applicant: SAFRAN TRANSMISSION SYSTEMS, Colombes (FR)

(72) Inventors: Julie Marie Renée Lemoine, Moissy-Cramayel (FR); Alexis Claude Michel Dombek, Moissy-Cramayel (FR); Balint Pap, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 16/646,730

(22) PCT Filed: Sep. 12, 2018

(86) PCT No.: PCT/FR2018/052236
§ 371 (c)(1),
(2) Date: Mar. 12, 2020

(87) PCT Pub. No.: WO2019/053373
PCT Pub. Date: Mar. 21, 2019

(65) Prior Publication Data
US 2020/0300172 A1 Sep. 24, 2020

(30) Foreign Application Priority Data

Sep. 12, 2017 (FR) ........................ 1758421

(51) Int. Cl.
*F16H 57/08* (2006.01)
*F02C 7/36* (2006.01)
(Continued)

(52) U.S. Cl.
CPC ................. *F02C 7/36* (2013.01); *F16H 1/28* (2013.01); *F16H 57/0018* (2013.01);
(Continued)

(58) Field of Classification Search
CPC . F02C 7/36; F16H 1/28; F16H 57/043; F16H 57/0482
See application file for complete search history.

(56) References Cited

U.S. PATENT DOCUMENTS 6,964,155 B2 * 11/2005 McCune .................... F02C 7/36
384/297
8,574,118 B2 * 11/2013 McCune .................... F02C 7/32
475/331
(Continued)

FOREIGN PATENT DOCUMENTS

EP    2 607 695 A1    6/2013
FR    2 991 421 A1    12/2013

OTHER PUBLICATIONS

International Patent Application No. PCT/FR2018/052236, International Search Report and Written Opinion dated Dec. 19, 2018, 21 pgs.

*Primary Examiner* — Derek D Knight
(74) *Attorney, Agent, or Firm* — Lathrop GPM LLP

(57) ABSTRACT

The invention relates to a pivot pin (5) for an epicyclic gear train sliding bearing, having axially opposed, laterally open circumferential grooves (25a) providing flexibility to the pivot pin, each groove having a radial width and at least one depth (P). At least one of the circumferential grooves (25a,25b) has a said width and/or depth (P) which varies circumferentially.

20 Claims, 5 Drawing Sheets

Figure 1:
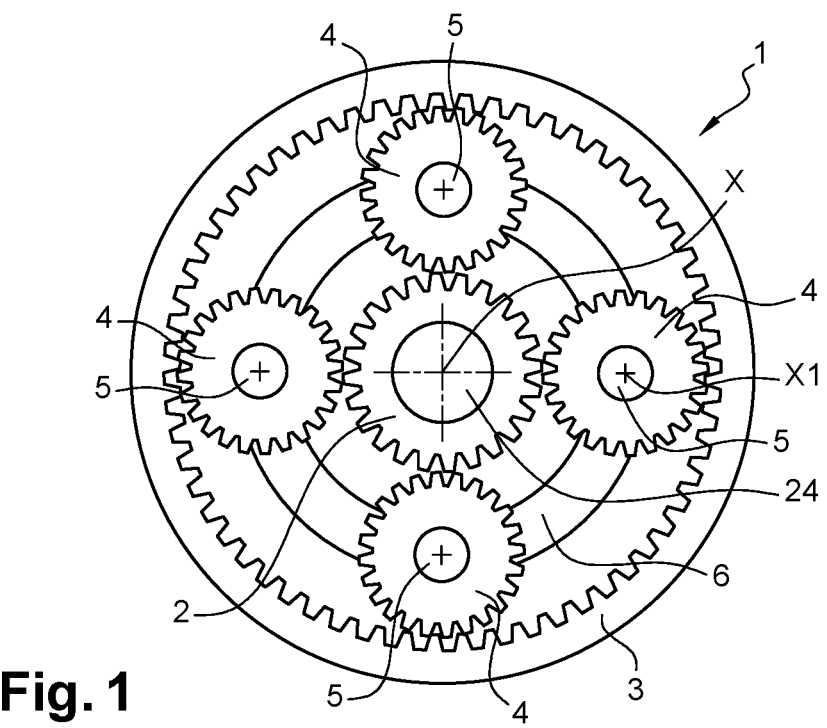

(51) Int. Cl.
*F16H 1/28* (2006.01)
*F16H 57/00* (2012.01)
*F16H 57/04* (2010.01)

(52) U.S. Cl.
CPC ....... *F16H 57/043* (2013.01); *F16H 57/0482* (2013.01); *F16H 57/08* (2013.01); *F05D 2260/40311* (2013.01); *F05D 2260/98* (2013.01)

(56) References Cited

U.S. PATENT DOCUMENTS

| | | | |
|---|---|---|---|
| 10,683,773 B2* | 6/2020 | Savaria | F01D 25/166 |
| 10,851,671 B2* | 12/2020 | Simard-Bergeron | F16C 17/02 |
| 2010/0331140 A1* | 12/2010 | McCune | F01D 25/162 |
| | | | 475/331 |
| 2012/0309582 A1 | 12/2012 | Mccune | |

* cited by examiner

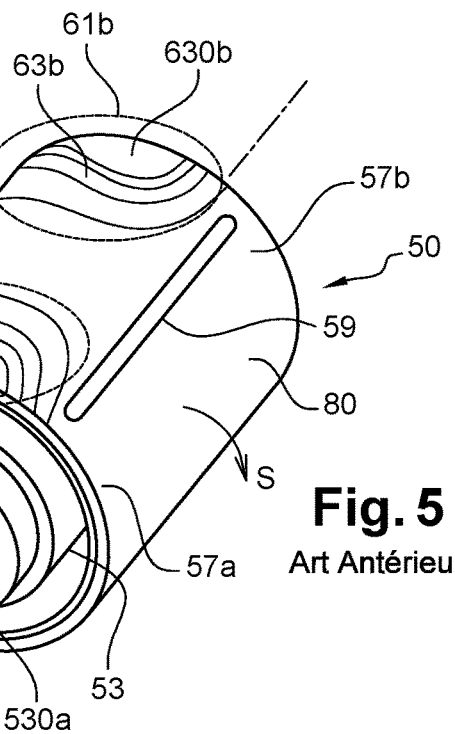
Fig. 5
Art Antérieur
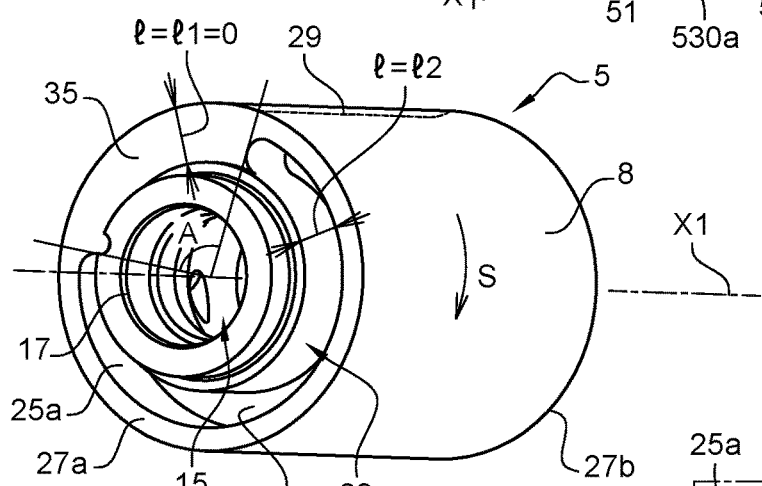
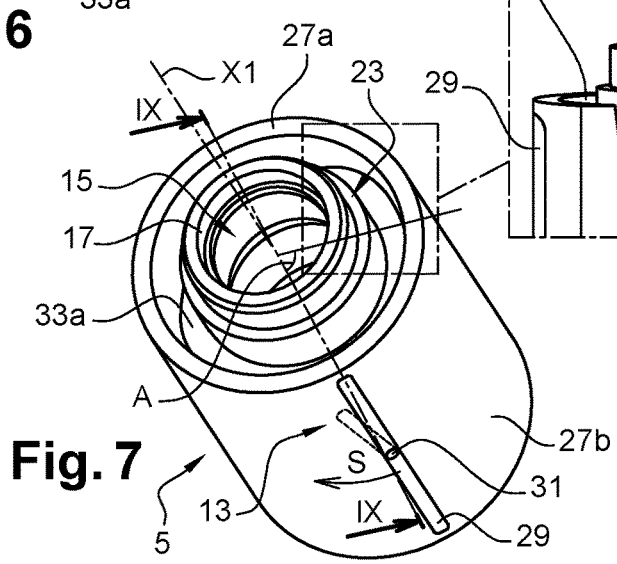
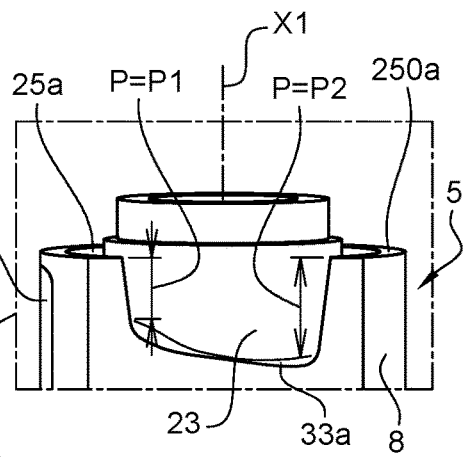

PIVOT FOR SLIDING BEARING AND GEAR TRAIN

CROSS-REFERENCE TO RELATED APPLICATIONS

This application is a 35 U.S.C. § 371 filing of International Application No. PCT/FR2018/052236 filed Sep. 12, 2018, which claims the benefit of priority to French Patent Application No. 1758421 filed Sep. 12, 2017, each of which is incorporated herein by reference in its entirety.

The present invention relates to a sliding bearing pivot pin and one planetary gear, in particular for an aircraft gas turbine engine, equipped with at least one such pivot pin.

The aimed application is for an epicyclic gear train which comprises an outer ring gear and planet pinions engaged with the central pinion and with the outer ring gear and each mounted so as to be free to rotate on a planet carrier, with the planet pinions each being able to rotate about a planet axis through a pivot pin.

This concerns in particular:

the epicyclic gear trains in which the outer ring gear (a mounting also called epicyclic reducing gear) is mobile in rotation, but also those in which the planet carrier is fixed and the outer ring gear (a mounting also called planetary reducing gear) is mobile.

The planet carrier is fixed or able to pivot about the axis of the inner sun gear and the outer sun gear.

The inlet can be formed by the inner sun gear and the outlet by the planet carrier.

In an aircraft gas turbine engine, epicyclic gear trains are used in particular as speed reducers for reducing the speed of rotation of the fan rotor, regardless of the rotational speed of the turbine.

The document FR 2,991,421 describes such an epicyclic reducing gear, wherein the sprocket wheels forming the planet gears are mounted on pivot pins of the planet carrier by means of sliding bearings, which is advantageous, in terms of space requirements and weight. Their service life is almost infinite, so long as they are continuously supplied with oil and the oil includes no abrasive particle.

This sensitivity to lubrication means that the deformation of the bearing on the pivot pin side and the operational temperature thereof must be checked.

However, during TEHD (thermo-elasto-hydro-dynamic) calculations on a pivot pin for a conventional sliding bearing, heating of the active surface of the pivot pin (a radially outer surface forming part of the bearing once the pivot pin is mounted between the satellite and the satellite carrier) was observed, in particular in a zone located circumferentially just upstream of the passage, such as a slot, for supplying oil to said active surface of this pivot pin.

However, non-identical misalignments were observed between upstream and downstream bearing seatings of different pivot pins. Tangential displacements, due to applied torques, and/or radial displacements, due to centrifugal force, and not symmetrical between upstream (AM) and downstream (AV) along the axis of rotation X, were observed on pivot pins.

This is damaging as it can affect the reliability of the pivot pin and the efficiency of the bearing.

One of the aims of the invention is to provide a simple, effective and economical solution to at least a part of these problems.

For this purpose, it provides a pivot pin for a sliding bearing of a planetary gear train, the pivot pin having a portion forming a central shank, extending around an axial passage, of the pivot pin, and axially open (i.e. laterally) axially opposed circumferential grooves, thus providing flexibility to the pivot pin, which radially separate two axially opposed lateral end portions of the central shank, from two cantilevered lateral portions of the pivot pin, each circumferential groove having a free lateral end and:

radially, at least one width, as well as at least one depth, in a direction in which the circumferential groove extends inwardly in the pivot pin, from the free lateral end to a bottom end of that groove, this pivot pin being characterized in that at least one of the circumferential grooves has a said width and/or a said depth which vary(ies) circumferentially.

By thus angularly varying the width and/or the depth of at least one of the flexibility zones formed by the cantilevered lateral parts, the distribution of the material in the pivot pin is modified with respect to a pivot pin with circumferential grooves which are uniformly identical radially and in the direction of their depths, it being recalled that these circumferential grooves make it possible to reduce the rigidity of the pivot pin in order to limit the misalignment between the active surface of the pivot pin and its bearing seatings. However, the need for flexibility has proven not to be necessary in all directions. It is therefore possible to reduce this width and/or depth in zone(s) of flexibility in high heating locations, in order to increase the conduction and thus reduce the temperature of the active zone, without altering the quality of the above-mentioned alignment. One cause of the above-mentioned local temperature increase was found to be related to the presence of trapped air in the zone of flexibility. The proposed solution addresses this. The absence of matter limits the conduction of heat and therefore the evacuation of calories.

Tests and measurements having confirmed that the flexibility granted by the above-mentioned zones of flexibility could even be locally removed, it is even proposed that said at least one circumferential groove of the pivot pin should have said reduced width and/or depth, which may be equal to zero over part of the circumference. This is the circumference of the outer surface of the pivot pin intended to form part of the sliding bearing. More generally, said width and/or depth may of course be reduced locally only slightly more than on the rest of the circumference.

In this case, further tests and measurements have confirmed that (a) so-called reduced width(s) and/or depth(s), which may be zero, extending over an angular sector between 45° and 110° circumferentially ensured a favourable compromise between guided bearing seating and good heat dissipation.

With comparable effects, an alternative or complementary approach to the above has also proved possible, if it is provided for alone, or if the two lateral cantilevered parts present one the above solution: namely that at least one of the circumferential grooves (i.e. of the two lateral cantilevered parts) is annular, presenting then, of course:

a depth that varies circumferentially, if the depth of the other is conventional, or a width which itself varies circumferentially.

Therefore, in order to further promote these heat transfers and the efficiency in the anti-misalignment effect, it is furthermore recommended that the above-mentioned pivot pin should be a single piece, with its cantilevered lateral parts and its central shank being in one piece.

As regards the planetary gear train for an aircraft gas turbine engine, which is also concerned by the invention, now, it is provided that it will have an outer ring gear and planet pinions engaged with the central pinion and with the outer ring gear, and mounted so as to be free to rotate on a planet carrier, the planet pinions each being able to rotate about a planet axis (X) through said above-mentioned pivot pin, with all or part of its characteristics.

It is also provided that this planetary gear may additionally include means for supplying oil to an interface between a said planet pinion and the pivot pin in question. At least one said pivot pin will then preferably have a radially outer circumferential surface which will have at least one passage for the supply of a lubricating liquid, said width (I) and/or depth (P) being minimum in a lateral area of the pivot pin adjacent to this/these passage(s) and located angularly on the side opposite that towards which the lubricant flows (direction S below) on the outer surface when the planetary gear can rotate, thus that its gears are operational.

Such a planetary gear is efficient in that it combines performance in the expected alignment of the parts concerned with a limitation of hot spots that are harmful both mechanically for the structure of the parts and for the lubricant.

As for the above-mentioned turbine engine, which is also concerned as such, it may comprise such a planetary gear, the central pinion of which can surround and be solidarized in rotation with the shaft of the turbine engine compressor.

In particular, this could be a case where the outer ring gear is solidarized with a casing or a static annular ring of the low-pressure compressor.

Alternatively, the planet carrier will be solidarized with a casing.

If, within an epicyclic gear train which the invention is thus specifically applicable to, the outer ring gear is fixed, the planetary gear train can be called a reducing gear since the output speed, i.e. that of the planet carrier, is lower than the input speed, i.e. that of the rotating drive shaft of the central pinion.

The planet carrier can then, for example, be connected to a fan wheel upstream (AM) of the turbine engine, whose speed is thus lower than the speed of the compressor shaft.

Another aspect on which the invention intervened is the method for producing a slide-bearing pivot pin.

Indeed, to the knowledge of the inventors until now, no method has ever been defined to obtain a good evacuation of calories, or even a favorable compromise between this evacuation and a bearing seating always efficiently guided.

This is how we propose here a method for producing the pivot pin mentioned above, again with all or some of its characteristics, where:

on a first pivot pin (referred to as a referent) constituted as aforesaid, except in that it has a said width and/or a said depth which does not vary circumferentially, temperature fields of the pivot pin are determined by a TEND model at least at the location of at least one of the lateral cantilevered parts, at least one zone is identified at this location that the TEHD model indicates as the highest temperature zone(s), and then on a second pivot pin as aforesaid, the place where said width and/or said depth is (are) minimum is positioned angularly about its axis (X1) and in correspondence of the zone of the highest temperature(s).

This way of operating is fast, simple and reliable.

It is specified that the thermo-hydrodynamic method in the context of lubrication, known as THD, consists in determining the temperature fields in the lubricating fluid but also in the solids constituting the contact in conjunction with the hydrodynamic pressure field in the lubricating film.

For this purpose, the Reynolds equation, whose main parameter is pressure, is associated with two additional equations: the energy equation which will make it possible to determine the temperature at any point in the fluid, and the Fourier equation which will make it possible to determine the temperature in solids (shaft, connecting rod, bearing, etc.). The model is said to be thermo-elasto-hydro-dynamic, noted TEHD, when elastic and thermoelastic deformations are taken into account in addition to purely thermal phenomena in the overall solution of the problem. It goes without saying that thermal deformations of solids can only be taken into account if the temperatures in the solids are known.

Figure 2:
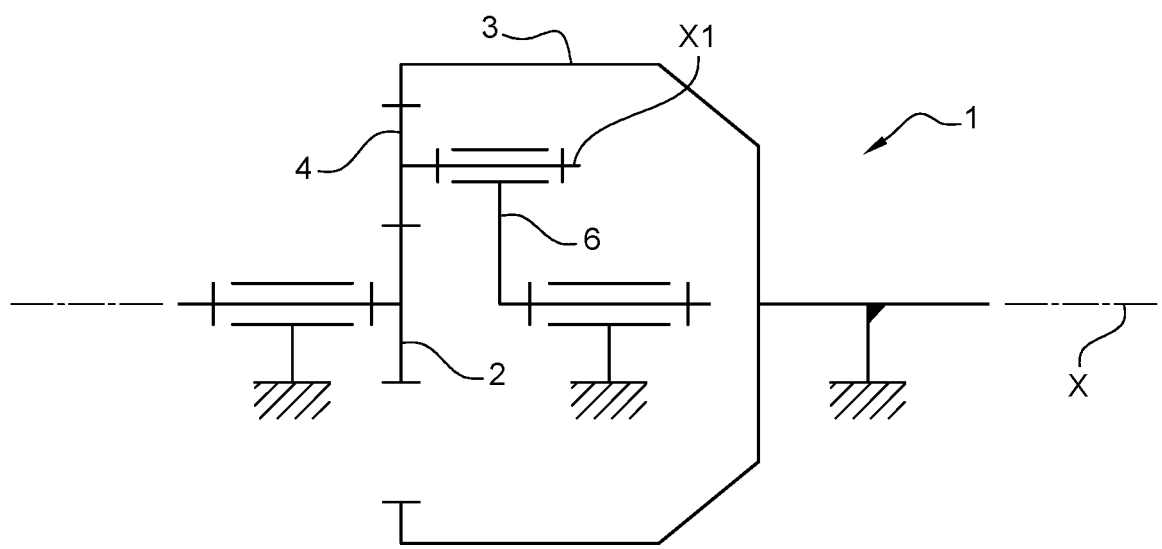
Figure 3:
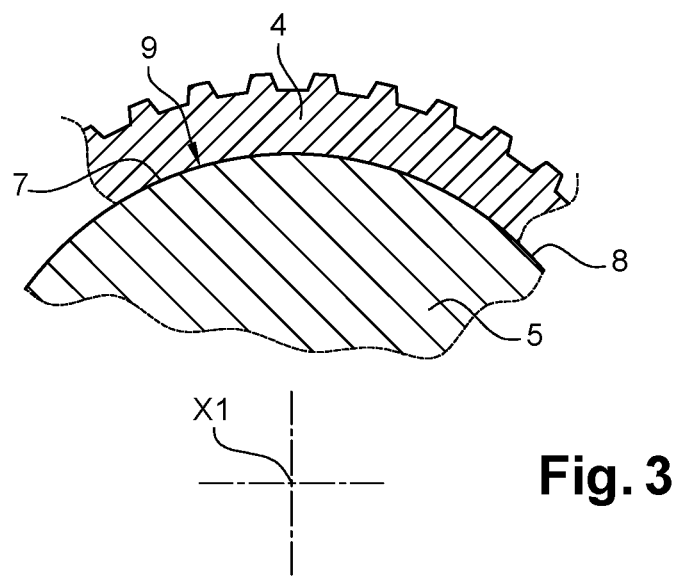
Figure 4:
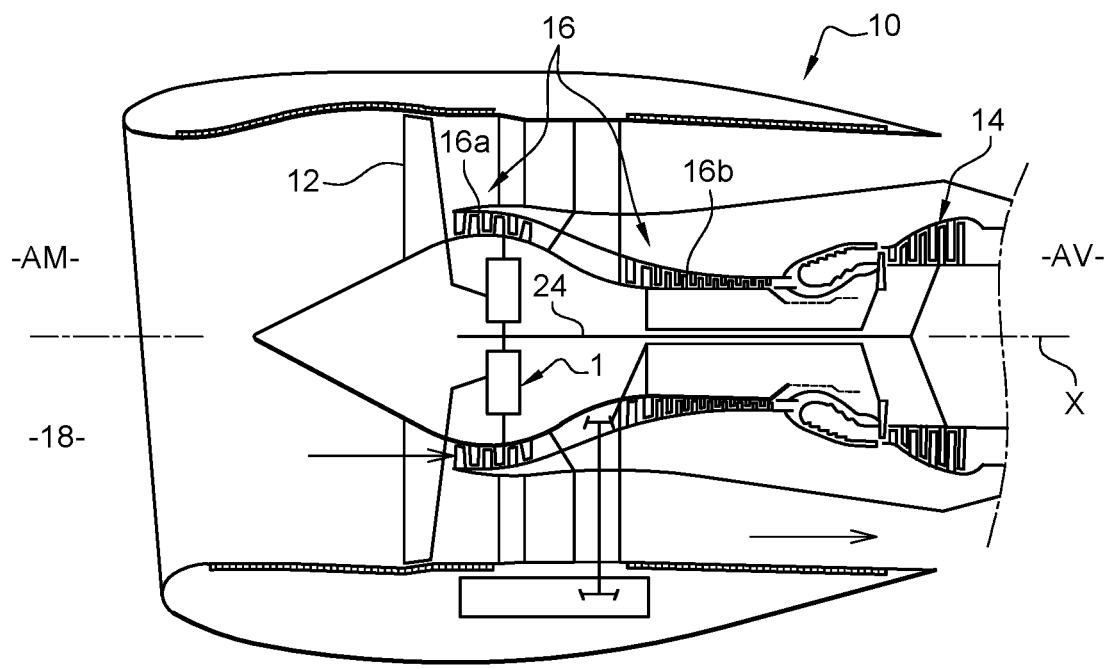
Figure 9:
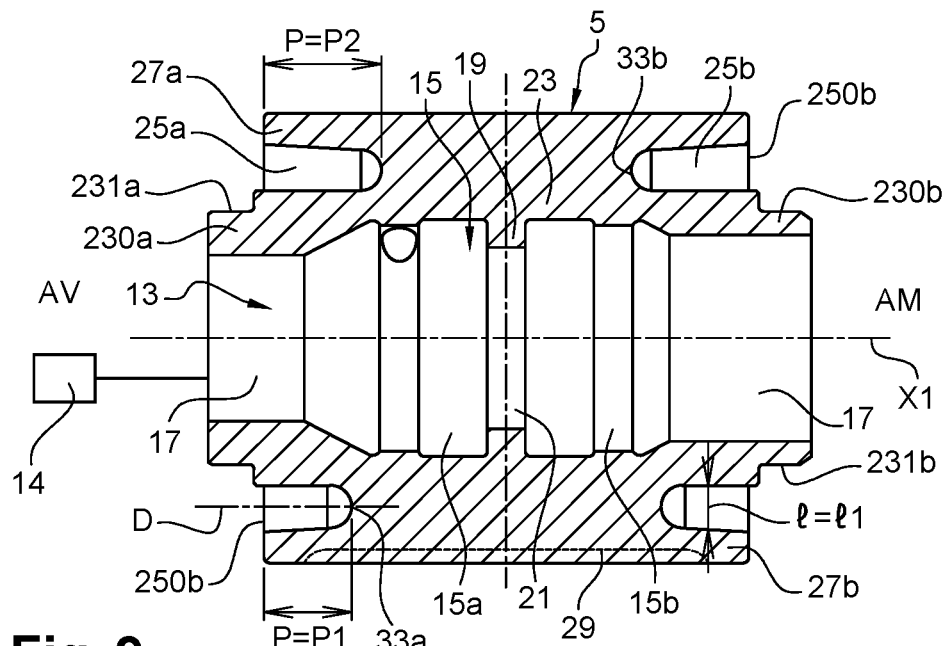
Figure 12:
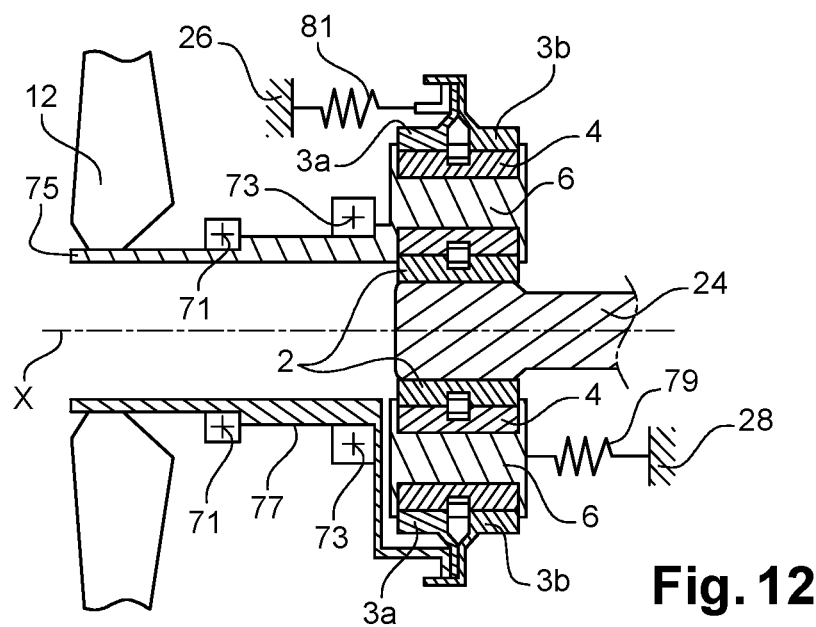
Figure 10:
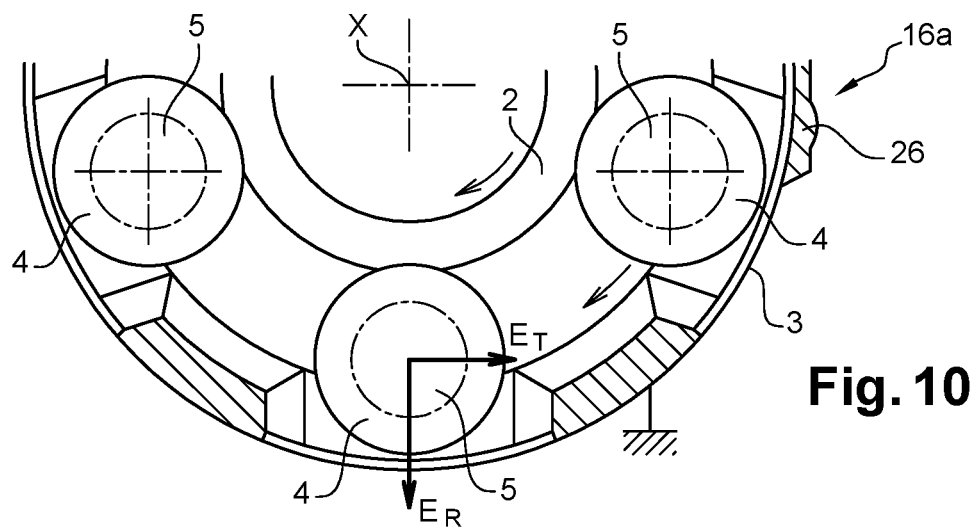
Figure 11:
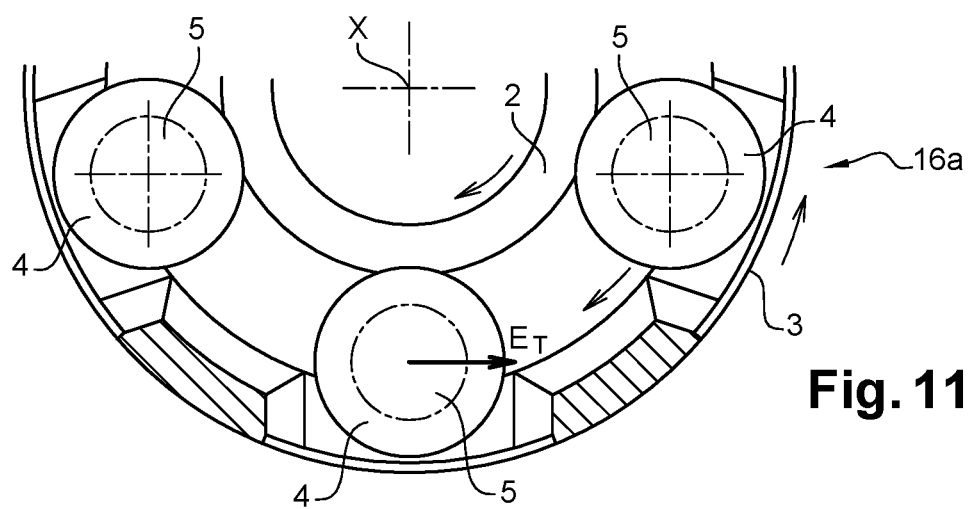

The invention will, if necessary, be better understood and other details, characteristics and advantages of the invention will become apparent upon reading the following description as a non-exhaustive example with reference to the appended drawings wherein:

FIG. 1 is a front diagram of a planetary gear,
FIG. 2 is a kinematic diagram of an epicyclic gear train,
FIG. 3 is a local sectional view of the sliding bearing,
FIG. 4 is a longitudinal diagram of a turbine engine,
FIG. 5 is a perspective view of a pivot pin of the prior art,
FIGS. 6,7 are two possible embodiments of a pivot pin according to the invention,
FIG. 8 is an enlarged detail of FIG. 7,
FIG. 9 is an axial cross-sectional view along IX-IX of FIG. 7,
FIG. 10 is a diagram of pivot pins mounting in an epicycloid configuration,
FIG. 11 is a schematic diagram of pivot pins mounting in a planetary configuration and,
FIG. 12 compares two epicyclic (at the top) and planetary (at the bottom) gear solutions.

FIGS. 1 and 2 schematically illustrate the structure of a planetary gear 1 on which the invention can be based. The planetary gear 1 typically includes an inner sun gear 2 (also called a sun gearing) and an outer sun gear 3 (also called an outer ring gear), the two sun gears being coaxial. The inner sun gear, or central pinion 2, can be movable in rotation around its X axis, while the outer sun gear 3, or outer ring gear can be fixed, or vice versa. The planetary gear 1 further comprises planet gears or planet pinions 4 mounted to be movable in rotation on pivot pins 5 of a planet carrier 6. Each planet gear 4 meshes with both the inner sun gear 2 and the outer sun gear 3. The planet carrier 6 is fixed or able to pivot pin about the axis X of the inner sun gear 2 and the outer sun gear 3. The inlet can be formed by the inner sun gear 2 and the outlet by the planet gear carrier 6.

The planet gear carrier 6 is for example coupled in rotation to an impeller (in the case of a turboprop) or a fan wheel (in the case of a turbojet engine).

In an aircraft gas turbine engine 10, epicyclic gear trains individually marked 1 are more particularly used as speed reducers to reduce the rotational speed of a rotor, such as a blower 12 FIG. 4, independently from the rotational speed of at least one turbine 14 axially coupled downstream to at least one compressor 16 with which the turbine engine is also equipped. First the front air inlet 18, then the blower 12 and the compressor 16 are passed through by air.

The central pinion, or inner sun gear 2, surrounds and is then fixed in rotation to the shaft 24 of the compressor 16, as illustrated for example in FIGS. 1,4. In particular, the planetary gear train 1 can be mounted in a radially formed annular enclosure inside a low-pressure compressor 16a arranged downstream of the blower 12 and upstream (AM) of a high-pressure compressor 16b.

As best seen in FIGS. 1 to 3, each planet gear 4 includes a cylindrical inner surface 7 mounted to pivot about a cylindrical surface 8 (the outer bearing seating surface) of the pivot pin 5 corresponding to the planet carrier 6 so as to form a sliding bearing.

The interface 9 between the two cylindrical surfaces 7, 8 therefore must be supplied with oil. For this purpose, as shown in FIG. 6, the epicyclic gear train 1 comprises lubricant supply means 13 connected to a lubricant source 13a and comprising a chamber 15 (51 FIG. 5), also called an axial passage, extending substantially along the axis X1 of the relevant pivot pin 5. At least one of the ends 17 of the chamber 15 is connected to an oil inlet channel. If only one of the ends 17 forms an oil inlet, the other end is plugged. The chamber 15 can be generally cylindrical. It consists of one or more part(s), such as the two parts 15a,15b (see FIG. 9) separated by a radially extending median partition 19. The lateral ends 17 of the chamber 15 are provided with axial passages having a smaller diameter than the chamber 15, with at least one such passage forming an oil inlet, as indicated above. A hole 21 providing communication between the portions 15a, 10b of the chamber 15 goes through the central wall 19. FIG. 5 shows a conventional pivot pin 50 which, like those 5 according to the invention (see FIGS. 6-9), has a (substantially) cylindrical outer surface (marked 80 for the pivot pin 50 and 8 for the pivot pin 5) of axis X1, adapted to form a sliding bearing with the (substantially) cylindrical inner surface (7 in FIG. 1) of the relevant satellite pinion 4 of axis X1.

Each pivot pin respectively 5,50 has a part forming a radially central shank respectively 23,53, extending around the axial passage respectively 15,51. It is around the axis X1 that the pivot pin is adapted to rotate, in the direction S imposed by its mounting on the reducing gear. In addition, each pivot pin has axially opposed circumferential grooves respectively 25a,25b,55a, which are open axially (i.e. laterally), providing the pivot pin with flexibility (FIG. 5, the inside of the other end of the pivot pin is not visible, hence the only marker 55a mentioned). These circumferential grooves separate radially from two cantilevered side parts respectively 27a,27b,57a,57b two lateral end parts respectively 230a,230b,55a (the other is not visible in FIG. 5), each with circumferential bearing surfaces 231a,231b and axially opposite the central shank.

The radially outer circumferential surface 8,80 has an elongated feed slot respectively 29,59 parallel to the axis X1 for the supply of lubricating liquid. This slot communicates with a radial passage (31, FIG. 7), which communicates with the above-mentioned axial passage (15,51). The liquid lubricant coming out of the slot 29,59 is considered to flow on the outer surface 8,80 in the S-direction of FIGS. 5-7, when the epicyclic gear train 1 is running.

On the pivot pin 50 of the prior art, heating of its active surface, and therefore of its outer surface 80, was observed, particularly circumferentially upstream of the groove 59; zones 61a,61b in FIG. 5.

It turns out that this local temperature increase is created by the air trapped in the zone of flexibility (cantilevered lateral parts 57a,57b). The absence of matter limits the conduction of heat and therefore the evacuation of calories. As a reminder, the recess in the zone of flexibility (circumferential grooves, such as 55a) reduces the rigidity of the pivot pin to reduce the misalignment between the active surface of the bearing and its seatings. However, the need for flexibility is not necessary in all directions, so it is possible to limit the extent of the zone of flexibility in areas of high temperature rise, in order to increase conduction and thus decrease the overall temperature on the outer circumferential surface 8,80.

This has led inventors to imagine the following methodology of approach which the invention relates to:

First, they have determined by a TEND model and on a pivot pin such as the one referenced 50, temperature fields such as 63a,63b, at least at the location of at least one of the cantilevered lateral parts 57a,57b.

Next, they have identified at that (or each) location, at least one area that the TEND model indicated as the area(s) of highest temperature(s), as in 630a,630b in FIG. 5.

Then they have intervened on the pivot pin 5 of the invention so that it is manufactured with at least one circumferential groove 25a and/or 25b modified with respect to the prior art, in particular FIG. 5, as in the two embodiments more particularly presented here in connection with FIG. 6, on the one hand, and 7,9 on the other hand.

Before detailing this modification, it should also be noted that, in FIG. 9, each circumferential groove 25a,25b has (which could also be seen on the pivot pin 50 of the prior art or on the pivot pin in FIG. 6) a free lateral end, respectively 250a,250b, located at the corresponding free end of the cantilevered lateral part 27a or 27b under consideration.

Each circumferential groove also has:

at least one depth P, in a direction (such as D in FIG. 9 for the groove 25a) in which the circumferential groove extends inwardly of the pivot pin, from the free side end (such as thus 250a) to a bottom end, such as 33a (see also marker 33b for the groove 25b), and at least one width I (which can be considered as a section, or a diameter, depending on the shape of the groove).

The proposed solution is therefore to vary these widths and/or depths of the zone of flexibility, depending on the location considered on the circumference of the pivot pin.

Roughly speaking, the direction (such as D) in which a circumferential groove extends is axial (parallel to the axis X1). More finely, a radial inclination of a few degrees inwards can be noted.

In any case, the modification which leads to the solution of the invention, comprises a fabrication of the pivot pin 5 such that at least one of the circumferential grooves 25a or 25b has a said width and/or a said depth which varies circumferentially, so that, for example in two places as shown in FIGS. 8,9:

$P1 \leq P \leq P2$, and/or, $I1 \leq I \leq I2$, the width and/or depth of the cantilevered side parts 27a,27b vary accordingly.

It is furthermore advisable, as illustrated, to position angularly, around said axis X1, and in correspondence of zone 630a and/or 630b of the highest temperature(s), the place where said width and/or depth is minimum.

Thus, considering that this advice has been applied to FIGS. 6-8, these locations are angularly located adjacent to the lubricant supply slot 29. It is further recommended that this (these) minimum width and/or depth area(s) and/or direction(s) should correspond to the area(s) or direction(s) where there is no particular need for flexibility.

In fact, in the solution shown in FIG. 6, it is the choice of reduced width and depth(s), which may be zero (I=0; P=0) of a part of at least the circumferential groove 25a that is presented.

Thus, on an angular sector A which, considered over the axial length of the pivot pin, includes the area of the slot 29, the pivot pin 5 is, at least at one lateral end, devoid of a part of its lateral cantilevered part, here 27a, since in this example a part of the circumferential groove 25a therefore no longer exists. It is occupied by the solid matter of the pivot pin.

Preferably, in order to combine ease of manufacture, reliability and efficiency in terms of reducing thermal stresses, it is recommended that said reduced width and/or depth (I,P), which may be zero, extend over an angular sector A comprised circumferentially between 45° and 110°.

A majority part of this zone, or even all of it, marked 35 in FIG. 6, at said reduced width and depth (I,P), which may be zero, will extend angularly preferably (immediately) adjacent to the slot 29, on the side opposite that towards which the lubricant flows (S direction) on the outer surface 8 when the epicyclic gear train is operational (its gears may rotate), taking into account the zones 63a,63b identified in FIG. 5.

In a solution illustrated in FIGS. 7-9, a depth of (at least) a portion of at least one of the circumferential grooves, such as 25a, was chosen (P1≤P≤P2). Except at the bottom, in 33a, the groove width can be constant (I=I1, for example).

In this solution, the (each) circumferential groove concerned, as well as the (each) cantilevered lateral part, here 27a, can remain annular.

The solution in FIGS. 7-9 can be either alternative to the previous one or complementary: done then at the other end of the pivot pin.

For the same technical reasons as above, it is recommended that said minimum depth (P=P1; FIG. 8) be present on the same angular sector A:
preferably circumferentially between 45° and 110°, and where a majority part of this sector, or even all of it, having said minimum depth (P) extends angularly preferably (immediately) adjacent to the slot 29, on the side opposite that towards which the lubricant flows (S direction) on the outer surface 8 when the pivot pin is operational, taking into account the areas 63a, 63b identified in FIG. 5.

Achieving material continuity of the pivot pin at the locations with thermal constraints should promote heat conduction and thus lower the temperature on the outer circumferential surface 8 without disturbing the need for flexibility in the alignment, where required.

Therefore, in order to further promote these heat transfers and the efficiency in the anti-misalignment effect, it is furthermore recommended that the above-mentioned pivot pin should be in one piece, with its cantilevered lateral parts 27a,27b and its central shank 23 being in one piece.

FIGS. 10 and 12 (at the top) show again the case of a pivot pin assembly 5 in an epicyclic configuration, i.e. in a case where the central pinion 2 is mobile, but the outer ring gear 3 is fixed, integral with an outer casing or a static annular shell, 26 of the compressor 16, in particular of the low-pressure compressor 16a; see FIG. 12 above where a spring connection 81 connects the annular shell 26 to the half-rings 3a,3b. As illustrated, both tangential $E_T$, due to the applied torque, and radial $E_R$, due to the centrifugal force, efforts, are exerted on each pivot pin 5.

In FIG. 11, another application case is shown, of a mounting of pivot pins 5 in a planetary configuration, i.e. in a case where both the central pinion 2 and the outer ring gear 3 are able to rotate around the axis X of the compressor 16a, in particular of the low-pressure compressor. As illustrated, tangential forces ET due to the applied torques, are exerted on each pivot pin 5. This situation can be that of an open-rotor or a double blower.

FIG. 12 compares solutions with epicyclic gear trains in which:
at the top, the figure shows a mobile planetary carrier and fixed-crown solution,
at the bottom, the planetary gear is such that the planet carrier 6 is fixed (opposite a casing, or a static annular shell 28) and the outer ring gear is mobile (also called the planetary reducing train solution).

In connection with some of the previous figures, we find there in common a planet carrier 6 carrying planet gears 4, an inner sun gear 2 and an outer sun gear, here in two respectively upstream and downstream half rings 3a,3b with respect to the axis of rotation X. The internal sun gear 2 is engaged with the axial shaft 24, the shaft of the low-pressure compressor in the example. Bearings 71,73 support and axially guide the blower 12.

In the top solution, via an axial upstream extension 55 supported and guided by the bearings 71,73, the planet carrier 6 is engaged with the blower 12 and a fixed crown carrier is added, here connected to the upstream half crown 3a.

In the lower solution, the outer sun gear (the half-rings 3a,3b) engages with the blower 12 via an upstream axial extension 77 supported and guided by the bearings 71,73. The planet carrier 6 is fixed (spring connection 79 with the static annular shell 28).

The invention claimed is:
1. A pivot pin for an epicyclic gear train sliding bearing, the pivot pin having an axis, about which it can rotate, and a circumference, and further having:
a portion forming a central shank extending around an axial passage of the pivot pin, and
axially opposed circumferential grooves which are open laterally and which radially separate two axially opposed lateral end portions of the central shank from two lateral cantilevered portions of the pivot pin, each circumferential groove having a free lateral end and
a depth, in a direction in which the circumferential groove extends inwardly in the pivot pin, from the free lateral end to a bottom end,
wherein at least one of the axially opposed circumferential grooves has
said depth which varies circumferentially.
2. The pivot pin according to claim 1, characterized in that it is in one piece, with the central shank and the cantilevered lateral parts being in one piece.
3. The pivot pin according to claim 1, characterized in that said depth which varies circumferentially, extends over an angular sector comprised circumferentially between 45° and 110°.
4. A planetary gear train of an aircraft gas turbine engine, comprising an outer ring gear and planet pinions meshing with a central pinion and with the outer ring gear and each mounted for free rotation on a planet carrier, the planet pinions being able to rotate about a planet axis via one said pivot pin according to claim 3.
5. The pivot pin according to claim 1, characterized in that at least one of the circumferential grooves is annular.
6. A planetary gear train of an aircraft gas turbine engine, comprising an outer ring gear and planet pinions meshing with a central pinion and with the outer ring gear and each mounted for free rotation on a planet carrier, the planet pinions being able to rotate about a planet axis via one said pivot pin according to claim 1.
7. The planetary gear train according to claim 6, further comprising means for supplying oil at an interface between one of said planet pinions and said pivot pin, characterized in that said pivot pin has a radially outer circumferential surface which has at least one passage for supplying a lubricating liquid, said depth being minimum in a lateral area of the pivot pin adjacent to said at least one passage and located angularly on the side opposite that towards which the lubricant flows (S direction) on the radially outer circumferential surface when the epicyclic gear train can rotate.

8. An aircraft gas turbine engine comprising said planetary gear train according to claim 7, the central pinion of which surrounds and is solidarized in rotation with a shaft of a compressor of the turbine engine.

9. An aircraft gas turbine engine comprising said planetary gear train according to claim 6, the central pinion of which surrounds and is solidarized in rotation with a shaft of a compressor of the turbine engine.

10. The turbine engine according to claim 9, wherein the outer ring is solidarized with a casing or a static annular shell of said compressor which is a low-pressure compressor.

11. The turbine engine according to claim 9, wherein the planet carrier is solidarized with a casing or a static annular shell.

12. A method for making a pivot pin for an epicyclic gear train sliding bearing, the pivot pin having an axis about which it can rotate, and:
   a portion forming a central shank extending around an axial passage of the pivot pin, and
   axially opposed circumferential grooves which are open laterally, and which radially separate two axially opposed lateral end portions of the central shank from two lateral cantilevered portions of the pivot pin, each circumferential groove having a free lateral end and:
   radially at least one width,
   as well as at least one depth, in a direction in which the circumferential groove extends inwardly in the pivot pin, from the free lateral end to a bottom end,
   said width and/or said depth varying circumferentially, in which method:
   temperature fields of a reference pivot pin are determined by means of a thermo-elasto-hydrodynamic model, known as TEHD, at least at the location of at least one of the lateral cantilevered parts of said reference pivot pin,
   at least one zone is identified, at this location, that the TEHD model indicates as the highest temperature zone(s), and
   said pivot pin is made by angularly positioning, around said axis and in correspondence with the zone of the highest temperature(s), the place where said width and/or said depth is (are) minimum.

13. A pivot pin for an epicyclic gear train sliding bearing, the pivot pin having an axis, about which it can rotate, and a circumference, and further having:
   a portion forming a central shank extending around an axial passage of the pivot pin, and
   axially opposed circumferential grooves which are open laterally and which radially separate two axially opposed lateral end portions of the central shank from two lateral cantilevered portions of the pivot pin, each circumferential groove having a free lateral end and a width, radially to said axis,
   wherein at least one of the axially opposed circumferential grooves has said width which is equal to zero over part of the circumference.

14. The pivot pin according to claim 13, characterized in that said zero width extends over an angular sector comprised circumferentially between 45° and 110°.

15. A planetary gear train of an aircraft gas turbine engine, comprising an outer ring gear and planet pinions meshing with a central pinion and with the outer ring gear and each mounted for free rotation on a planet carrier, the planet pinions being able to rotate about a planet axis via one said pivot pin according to claim 14.

16. A planetary gear train of an aircraft gas turbine engine, comprising an outer ring gear and planet pinions meshing with a central pinion and with the outer ring gear and each mounted for free rotation on a planet carrier, the planet pinions being able to rotate about a planet axis via one said pivot pin according to claim 13.

17. The planetary gear train according to claim 16, further comprising means for supplying oil at an interface between one of said planet pinions and said pivot pin, characterized in that said pivot pin has a radially outer circumferential surface which has at least one passage for supplying a lubricating liquid, said width being minimum in a lateral area of the pivot pin adjacent to said at least one passage and located angularly on the side opposite that towards which the lubricant flows (S direction) on the radially outer circumferential surface when the epicyclic gear train can rotate.

18. An aircraft gas turbine engine comprising said planetary gear train according to claim 17, the central pinion of which surrounds and is solidarized in rotation with a shaft of a compressor of the turbine engine.

19. An aircraft gas turbine engine comprising said planetary gear train according to claim 16, the central pinion of which surrounds and is solidarized in rotation with a shaft of a compressor of the turbine engine.

20. The pivot pin according to claim 13, characterized in that at least one of the circumferential grooves is annular.

* * * * *